US008677396B2

(12) United States Patent
Kitazato

(10) Patent No.: US 8,677,396 B2
(45) Date of Patent: Mar. 18, 2014

(54) RECEPTION APPARATUS, RECEPTION METHOD, TRANSMISSION APPARATUS, TRANSMISSION METHOD, PROGRAM, AND BROADCAST SYSTEM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/515,247

(22) PCT Filed: Dec. 10, 2010

(86) PCT No.: PCT/JP2010/007194
§ 371 (c)(1),
(2), (4) Date: Jun. 11, 2012

(87) PCT Pub. No.: WO2011/074218
PCT Pub. Date: Jun. 23, 2011

(65) Prior Publication Data
US 2012/0291064 A1 Nov. 15, 2012

(30) Foreign Application Priority Data
Dec. 18, 2009 (JP) ................................. 2009-287228

(51) Int. Cl.
*H04N 7/10* (2006.01)
*H04N 7/16* (2011.01)
*H04N 7/173* (2011.01)

(52) U.S. Cl.
USPC ............... 725/32; 725/25; 725/110; 725/134; 725/142

(58) Field of Classification Search
USPC ............................... 725/25, 32, 110, 134, 142
See application file for complete search history.

(56) References Cited

U.S. PATENT DOCUMENTS 7,272,843 B1 * 9/2007 Nejime et al. ................... 725/32
8,254,975 B2 * 8/2012 Kroth et al. .................... 455/515
2005/0135368 A1 * 6/2005 Nakamura ..................... 370/392

FOREIGN PATENT DOCUMENTS

| JP | 2004-096799 | 3/2004 |
| JP | 2006-50237 | 2/2006 |
| JP | 2006-311120 | 11/2006 |
| WO | WO99/66722 | 12/1999 |
| WO | WO01/06688 | 1/2001 |
| WO | WO 2009/112556 A1 | 9/2009 |

OTHER PUBLICATIONS

Kate, Warner ten, et al.: Trigg & Link, "A New Dimension in Television Program Making." *Proceedings of the European Conference on Multimedia Applications, Services and Techniques*, (May 1, 1997), pp. 51-65, XP000668931, 15 pages.

(Continued)

*Primary Examiner* — Nathan Flynn
*Assistant Examiner* — Gigi L Dubasky
(74) *Attorney, Agent, or Firm* — Sherr & Jiang, PLLC

(57) ABSTRACT

To realize a service of data content that can interlock with AV content of programs without providing a band for broadcasting data content in a broadcast band for digital television broadcast, provided is a reception apparatus that receives an audio and/or video (AV) content, the apparatus including: an extraction section to extract trigger information from the AV content, the trigger information being related to an application program that is executed interlocking with a progress of the AV content, the trigger information including a trigger type; and a control section to control one of an activation of the application program, a dispatch of an event of the application program being executed, and an end of the application program being executed in accordance with the trigger type included in the extracted trigger information.

41 Claims, 14 Drawing Sheets

(56) References Cited

OTHER PUBLICATIONS

International Search Report in corresponding international application PCT/JP2010/007194, mailed May 16, 2012, 6 pages.

Oct. 22, 2013, Japanese Office Action for related JP application No. 2009-287228.

* cited by examiner

| Item | Description |
|---|---|
| Trigger ID | Information for identifying trigger information |
| Trigger type | Four types of application execute, application terminate, inject-event, and precache |
| Application ID | Information for identifying application |
| Application type | Information indicating type of application (html, java, etc.) |
| Business company ID | Information for identifying business company |
| Application URL | URL of server that acquires application when trigger type is application execute or precache |
| Accumulation application ID | Information for identifying already-downloaded application to be activated when trigger type is application execute |
| Automatic activation flag | Information indicating automatic activation or manual activation when trigger type is application execute |
| Application end time | End time of application when trigger information whose trigger type is application terminate is not received |
| Server access distribution parameter | Parameter for distributing access to server when trigger type is application execute or inject-event |
| Application name | Name of application to be presented to user |
| Event ID | Information for identifying event when trigger type is inject-event |

FIG.7

```
TriggerInfo_descriptor() {
    descriptor_tag                      8
    descriptor_length                   8
    trigger_id                          8
    trigger_type                        3    "1:app_launch, 2:app_end, 3:app_event, 4 precashe
    access_randamize_value              5
    application_id                      8
    application_type                    4
    reserved                            4
    if(trigger_type==1) {
        auto_start_flag                 1
        app_name_fl:ag                  1
        net_url_flag                    1
        stored_app_flag                 1
        reserved                        4
        app_valid_period                8
        if(app_name_flag==1) {
            app_name_length             8
            for(i=0,i<N,i++) {
                app_name_text           8×N
            }
        }
        if(stored_app_flag==1) {
            stored_app_id               16
        }
        if(net_url_flag==1) {
            for(i=0,i<M,i++) {
                net_url_text            8×N
            }
        }
    }
    if(trigger_type==2) {
        app_event_id                    8
    }
}
```

FIG.8

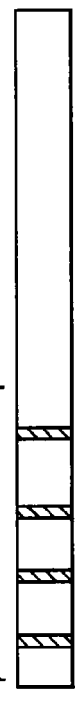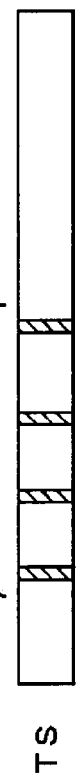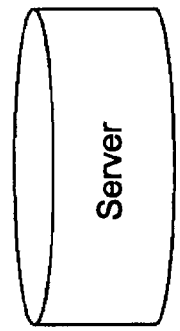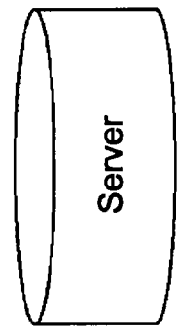
FIG.10A — Case where access distribution is not taken into consideration
FIG.10B — Case where access distribution is taken into consideration

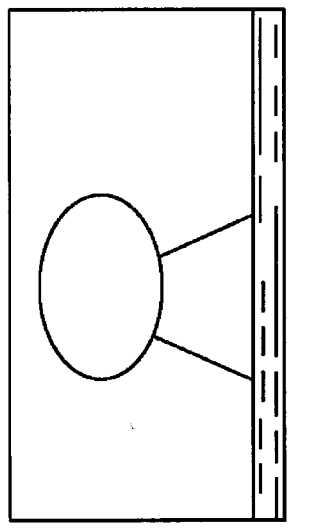
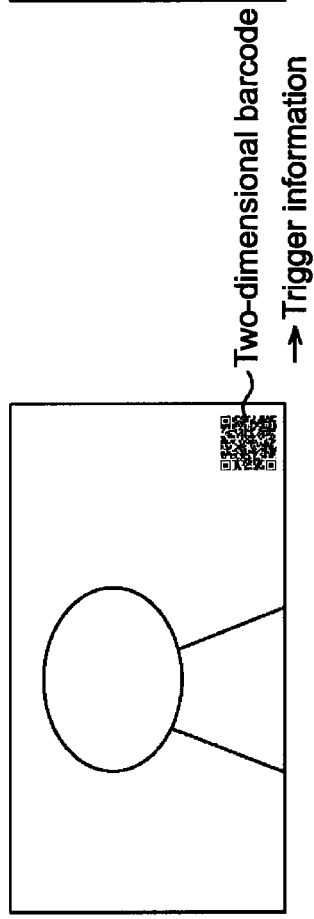
FIG.13A
FIG.13B
Two-dimensional barcode → Trigger information

US 8,677,396 B2

RECEPTION APPARATUS, RECEPTION METHOD, TRANSMISSION APPARATUS, TRANSMISSION METHOD, PROGRAM, AND BROADCAST SYSTEM

TECHNICAL FIELD

The present invention relates to a reception apparatus, a reception method, a transmission apparatus, a transmission method, a program, and a broadcast system, and more particularly, to a reception apparatus, a reception method, a transmission apparatus, a transmission method, a program, and a broadcast system that are suitable for use in a case of executing data content while interlocking with the progress of AV content corresponding to so-called television programs in digital television broadcast, for example.

BACKGROUND ART

From the past, the digitization of television broadcast has been promoted in Japan and terrestrial digital broadcast, BS digital broadcast, and the like are widely diffused. In addition, the digital television broadcast such as terrestrial digital broadcast realizes not only broadcast of AV content corresponding to so-called television programs but also so-called data content. Using data content, display of information related to a television program being broadcast (AV content), display of information that is not related to a television program being broadcast (announcement of another television program, news, weather report, traffic information, etc.), and execution of applications that interlock with a television program being broadcast (AV content) are enabled (see, for example, Patent Literature 1).

It should be noted that the broadcast of data content in Japan is realized by securing a band for data broadcast in a broadcast band for digital television broadcast in advance at a time of digitizing television broadcast, and broadcasting data content using this band.

Incidentally, in the digital television broadcast in the United States, one corresponding to the data broadcast in the digital television broadcast in Japan has not been realized. In other words, the broadcast band in the current digital television broadcast in the United States is occupied by a video band, an audio band, and a control information band as shown in FIG. 1A, and a band for broadcasting data content is not provided. Therefore, to secure a band for broadcasting data content in the limited broadcast band of the digital television broadcast, the video band and the audio band are necessary to be reduced in size as shown in FIG. 1B.

CITATION LIST

Patent Literature

PTL 1

Japanese Patent Application Laid-open No. 2006-50237

SUMMARY OF INVENTION

However, to reduce the sizes of the video band and the audio band to secure the band for broadcasting data content leads to the deterioration of image quality and sound quality of television programs, and results in undesirable performance.

In addition, since a retransmission system of digital television programs using a CATV (cable-TV) network is widely used in the United States, the following problems may also be caused.

FIG. 2 shows an example of a structure of a retransmission system of digital television programs using a CATV network.

The retransmission system mainly includes a broadcast or output apparatus 1, a CATV retransmission apparatus 2, a CATV network 3, a digital television set 4, a set top box (STB) 5, and a television set 6.

The broadcast apparatus 1 installed in a broadcast station or the like broadcasts, or alternatively, outputs to a transmitter, a digital television broadcast signal. For example, the broadcast may be by terrestrial waves or satellite waves. The CATV retransmission apparatus 2 installed in a cable TV station or the like receives digital television broadcast that has been broadcast, and removes unnecessary information therefrom and adds information specific to CATV thereto, to thereby retransmit the resultant to the digital television set 4, the set top box 5, and the like via the CATV network 3.

The CATV retransmission apparatus 2 includes a tuner 11, a PID filter 12 for filtering a packet of a predetermined packet ID, a CATV-specific signal generation section 13, a multiplexing section 14, and a modulation section 15.

The tuner 11 receives and demodulates a digital television broadcast signal of each channel and outputs a resultant TS (transport stream) to the PID filter 12. The PID filter 12 removes a packet (that is not related to AV content as television program) corresponding to a predetermined packet ID from the TS and outputs the TS to the multiplexing section 14. The CATV-specific signal generation section 13 generates a packet storing information specific to a relevant CATV station and outputs the packet to the multiplexing section 14. The multiplexing section 14 multiplexes the output of the PID filter 12 and the output of the CATV-specific signal generation section 13 and outputs the resultant to the modulation section 15. The modulation section 15 modulates the output of the multiplexing section 14 by a modulation system suitable for the CATV network 3 and retransmits the resultant to the digital television set 4, the set top box 5, and the like via the CATV network 3.

The digital television set 4 that supports CATV receives the TS of the retransmitted digital television broadcast via the CATV network 3 and decodes the TS, and then displays a resultant video and outputs audio at the same time.

The set top box 5 that supports CATV receives the TS of the retransmitted digital television broadcast via the CATV network 3 and decodes the TS, and then outputs resultant video and audio signals to the television set 6 via an HDMI cable or the like. The television set 6 displays the video and outputs the audio based on the video signal and the audio signal input from the set top box 5 via the HDMI cable or the like.

As described above, in the CATV retransmission apparatus 2, a packet (that is not related to AV content as television program) corresponding to a predetermined packet ID is removed from the TS of the digital television broadcast signal by the PID filter 12. As a result, even if a band for broadcasting data content is secured in the broadcast band as shown in FIG. 1B, there may be caused a case where packets storing the data content are removed by the PID filter 12.

In view of the circumstances as described above, it is desirable to realize a service of data content that can interlock with the progress of a television program without providing a band for data broadcast in a broadcast band for digital television broadcast.

According to an embodiment of the present invention, the application program can be controlled interlocking with the progress of the AV content such as a television program without providing a band for data broadcast in a broadcast band for digital television broadcast.

According to another embodiment of the present invention, there is provided a reception apparatus that receives an audio and/or video (AV) content, the apparatus including: an extraction section to extract trigger information (or other information regarding the data content) from the AV content, the trigger information being related to an application program that is executed interlocking with a progress of the AV content, the trigger information including a trigger type; and a control section to control one of an activation of the application program, a dispatch of an event of the application program being executed, and an end of the application program being executed in accordance with the trigger type included in the extracted trigger information.

According to another embodiment of the present invention, there is provided a transmission apparatus that transmits an audio and/or video (AV) content, the apparatus including a transmission section to store trigger information in the AV content to be transmitted, the trigger information being related to an application program that is executed by a reception apparatus, interlocking with a progress of the AV content. The trigger information includes a trigger type that includes at least one of an application activation of instructing an activation of the application program, an application event of instructing a dispatch of an event of the application program being executed, and an application end of instructing an end of the application program being executed.

According to yet another embodiment of the present invention, there is provided an apparatus for providing access to data content on a server. The apparatus may include an insertion unit configured to insert information regarding the data content into a digital television broadcast signal, the digital television broadcast signal not including the data content; and an output unit configured to output the digital television broadcast signal for broadcast.

According to yet another embodiment of the present invention, there is provided an apparatus for receiving data content. The apparatus may include a receiving unit configured to receive, over a first communication channel, a digital television broadcast signal containing information regarding the data content accessible over a second communications channel; and an extracting unit configured to extract the information regarding the data content from the digital television broadcast signal.

According to yet another embodiment of the present invention, there is provided a method for providing access to data content on a server. The method may include inserting information regarding the data content into a digital television broadcast signal, the digital television broadcast signal not including the data content; and outputting the digital television broadcast signal.

According to yet another embodiment of the present invention, there is provided a method for receiving data content. The method may include receiving, over a first communication channel, a digital television broadcast signal containing information regarding the data content accessible over a second communications channel; and extracting the information regarding the data content from the digital television broadcast signal.

According to yet another embodiment of the present invention, there is provided a system for delivering data content. The system may include a broadcasting apparatus configured to broadcast a digital television broadcast signal over a first communication channel, the digital television broadcast signal including information regarding the data content and not including the data content; and a server configured to transmit the data content over a second communications channel in response to a request for the data content.

According to yet another embodiment of the present invention, there is provided a computer-readable storage medium storing instructions which, when executed by a processor, cause a computer to perform a method. The method may include inserting information regarding data content into a digital television broadcast signal, the digital television broadcast signal not including the data content; and outputting the digital television broadcast signal.

According to yet another embodiment of the present invention, there is provided a computer-readable storage medium storing instructions which, when executed by a processor, cause a computer to perform a method. The method may include receiving, over a first communication channel, a digital television broadcast signal containing information regarding the data content; extracting the information regarding the data content from the digital television broadcast signal; and acquiring the data content over a second communications channel using the information regarding the data content.

BRIEF DESCRIPTION OF DRAWINGS

FIG. 7 is a diagram showing items included in the trigger information.

FIG. 8 is a diagram showing an example of a syntax of the trigger information.

FIG. 10 are each diagrams for describing distribution of access to a server.

FIG. 13 are diagrams each showing an example in which the trigger information is embedded in a base band video signal.

DESCRIPTION OF EMBODIMENTS

Hereinafter, best modes for carrying out the present invention (hereinafter, referred to as embodiments) will be described in detail with reference to the drawings.

1. First Embodiment

[Structural Example of Broadcast System]

Figure 3:
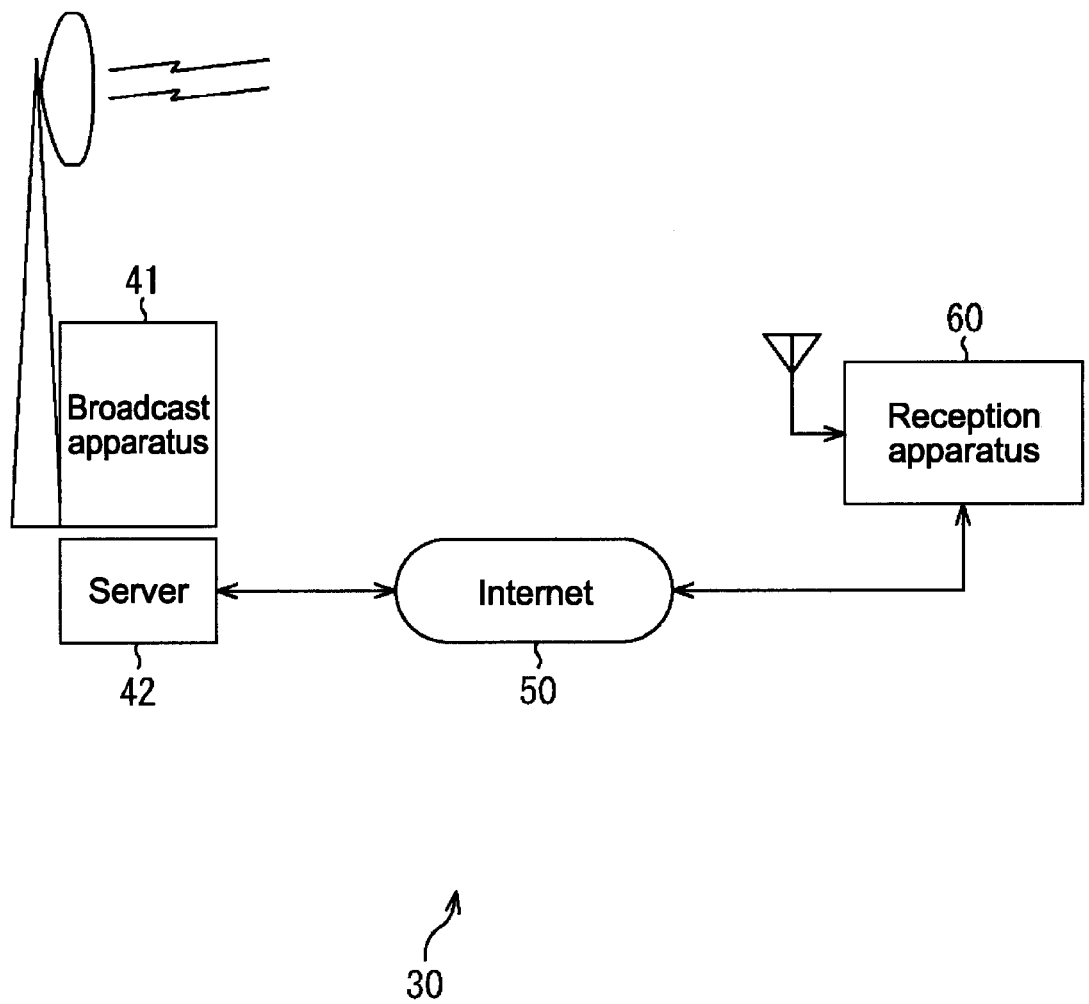
FIG. 3 is a diagram showing a structural example of a broadcast system to which an embodiment of the present invention is applied.

FIG. 3 shows a broadcast system 30 as this embodiment. The broadcast system 30 realizes a service of data content that can interlock with AV content of television programs without providing a band for broadcasting the data content in a broadcast band for digital television broadcast in the current United States, for example.

The broadcast system 30 includes a broadcast apparatus 41 and a server 42 that are installed on a broadcast station side, and a reception apparatus 60 installed on a receiver side.

Figure 1:
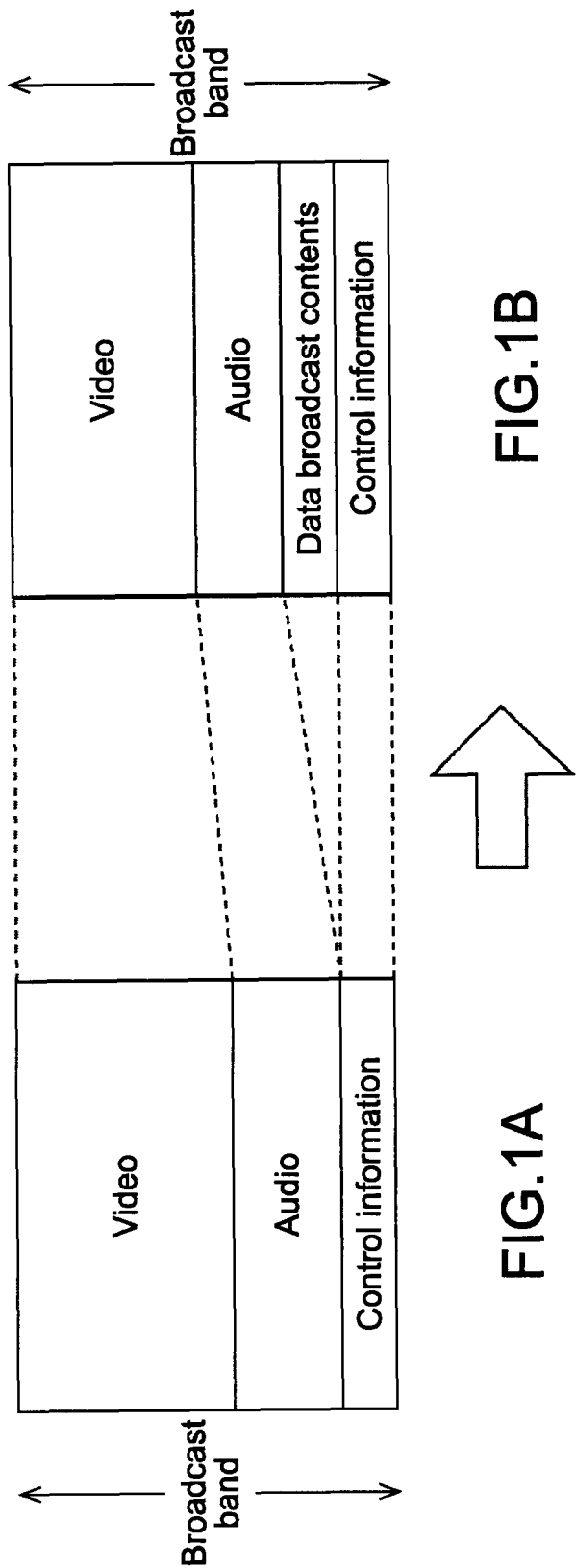
FIG. 1 are diagrams each showing a broadcast band for digital television broadcast.

The broadcast apparatus 41 outputs or transmits a digital television broadcast signal. It is assumed that a broadcast band of the digital television broadcast signal is occupied by a video band, an audio band, and a control information band as shown in FIG. 1A and a band for broadcasting data content is not provided.

Further, the broadcast apparatus 41 stores or inserts, at a predetermined timing, information regarding the data content, such as trigger information, in a packet that is defined not to be removed by CATV apparatus, such as a Program Clock Reference (PCR) packet in a TS packet constituting a TS (transport stream) of the digital television broadcast signal. Then, the broadcast apparatus 41 transmits the digital television broadcast signal storing the trigger information.

Here, the information regarding the data content may entirely be trigger information including information indicating an execution timing of a data broadcast content, information indicating an acquisition source of a data broadcast content, and the like. The trigger information will be described in detail with reference to FIGS. 5 to 8.

The server 42 supplies a data broadcast content or the like to the reception apparatus 60 in response to a request from the reception apparatus 60 that accesses the server 42 via an Internet 50.

The reception apparatus 60 receives the digital television broadcast signal that is broadcast from the broadcast apparatus 41 over a first communications channel, such as a terrestrial RF broadcast, and acquires video and audio of an AV content corresponding to a television program, to thereby output the acquired video and audio to a monitor (not shown). Further, the reception apparatus 60 accesses the server 42 over a second communications channel, such as via the Internet 50, and acquires a data broadcast content. It should be noted that the reception apparatus 60 may exist individually or may be incorporated into a television set or a video recorder, for example.

[Structural Example of Reception Apparatus]

Figure 4:
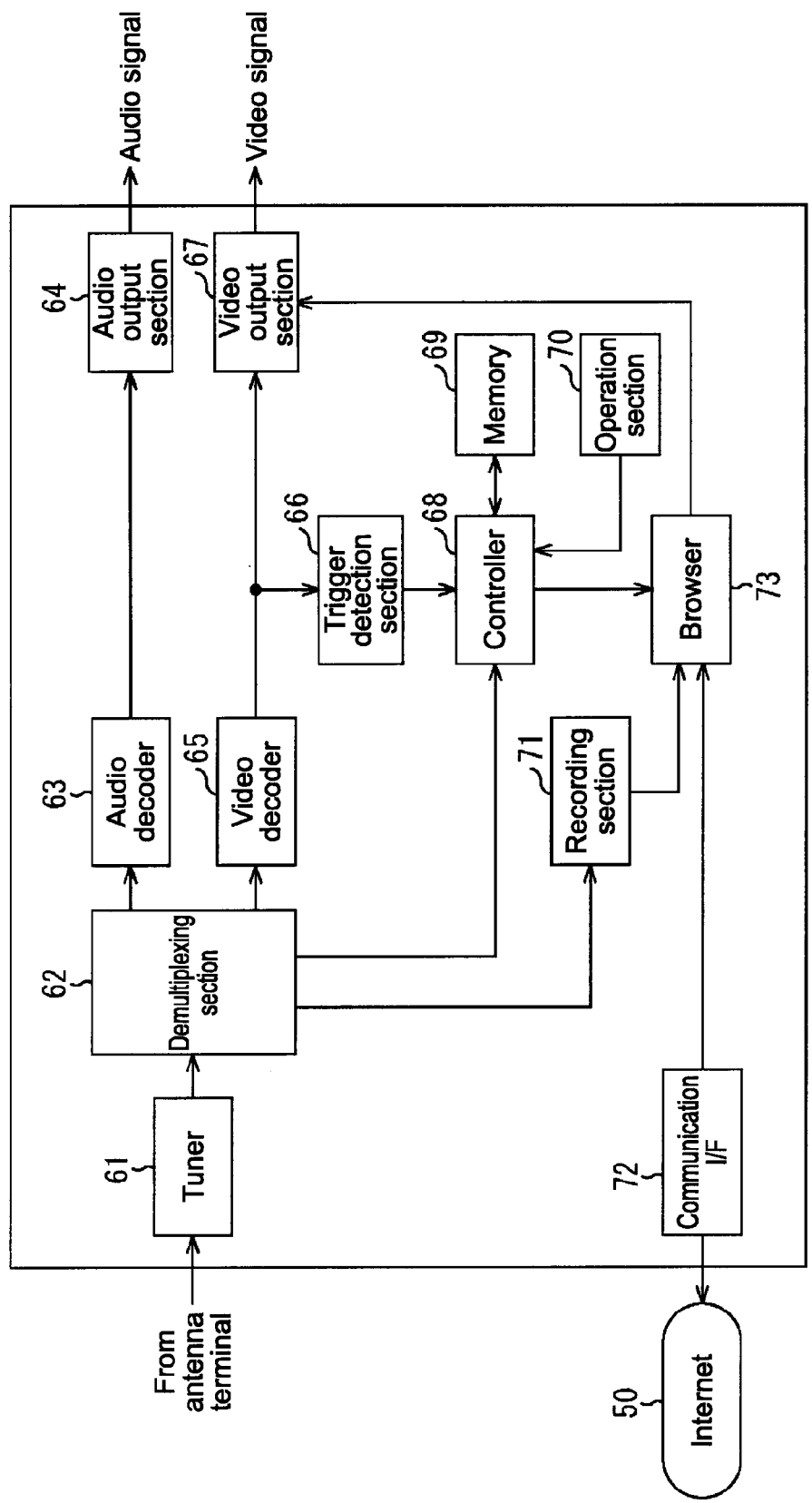
FIG. 4 is a block diagram showing a structural example of a reception apparatus to which the embodiment of the present invention is applied.

FIG. 4 shows a structural example of the reception apparatus 60. The reception apparatus 60 includes a receiving unit such as a tuner 61, an extracting unit such as a demultiplexing section 62, an audio decoder 63, an audio output section 64, a video decoder 65, a trigger detection section 66, a video output section 67, a controller 68, a memory 69, an operation section 70, a recording section 71, a communication I/F 72, and a browser 73.

The tuner 61 receives and demodulates a digital television broadcast signal corresponding to a channel selected by a user and outputs a resultant TS to the demultiplexing section 62. The demultiplexing section 62 demultiplexes the TS input from the tuner 61 into an encoded audio signal, a encoded video signal, and a control signal, and outputs the encoded audio signal, the encoded video signal, and the control signal to the audio decoder 63, the video decoder 65, and the controller 68, respectively.

Further, the demultiplexing section 62 extracts a PCR packet including the trigger information arranged in the TS and outputs the PCR packet to the controller 68.

The audio decoder 63 decodes the input encoded audio signal and outputs a resultant audio signal to the audio output section 64. The audio output section 64 outputs the input audio signal to a subsequent stage (for example, speaker).

The video decoder 65 decodes the encoded video signal thus input and outputs a resultant video signal to the trigger detection section 66 and the video output section 67. The trigger detection section 66 constantly monitors the input video signal and detects trigger information embedded in the video signal (which corresponds to another transmission method (described later) different from the transmission method in the case where the trigger information is stored in the PCR packet). The video output section 67 outputs the video signal input from the video decoder 65 to a subsequent stage (for example, monitor). Further, the video output section 67 combines a video of a data broadcast content that is input from the browser 73 and the video signal input from the video decoder 65 and outputs the combined resultant to the subsequent stage. It should be noted that the output from the audio output section 64 and the video output section 67 to the subsequent stages can be performed using an HDMI (High-Definition Multimedia Interface) cable.

The controller 68 controls the entire reception apparatus 60 by executing a control program recorded in the memory 69. Further, the controller 68 controls acquisition, activation, event dispatch, end, and the like of an application program for implementing a data broadcast content that interlocks with a television program based on the trigger information input from the demultiplexing section 62 (or trigger detection section 66).

In the memory 69, a control program executed by the controller 68 is recorded. The control program can be updated based on a digital television broadcast signal or update data acquired via the Internet 50. The operation section 70 receives various operations from the user and notifies the controller 68 of operation signals corresponding to the various operations.

The recording section 71 stores a downloaded data broadcast application in a built-in recording medium in a case where the data broadcast application is distributed using a digital television broadcast signal.

The communication I/F 72 is connected to the server 42 via the Internet 50 under the control of the browser 73. The browser 73 acquires an application program for data broadcast (hereinafter, referred to simply as data broadcast application) from the server 42 via the communication I/F 72 and the Internet 50 under the control of the controller 68.

[Details of Trigger Information]

Figure 5:
FIG. 5 is a diagram showing a concept of transmitting a PCR packet of a TS including trigger information.

FIG. 5 shows a concept of a case where the trigger information stored in PCR packets of a TS is transmitted. As shown in FIG. 5, the trigger information is not stored in all PCR packets but stored in PCR packets at only adequate timings for interlocking with an AV content corresponding to a television program. Since the PCR packet is a type of packet defined to remain in a transport stream after processing by a CATV retransmission system, the PCR packet passes through a PID filter 12 of a CATV retransmission apparatus 2 shown in FIG. 2 in general. The trigger information can thus be notified to a reception apparatus using a CATV network (digital television set 4 of FIG. 2).

It should be noted that depending on the contents of the trigger information, the same trigger information is transmitted a plurality of number of times in consideration of a case where the trigger information is not received by the reception apparatus 60.

Figure 6:
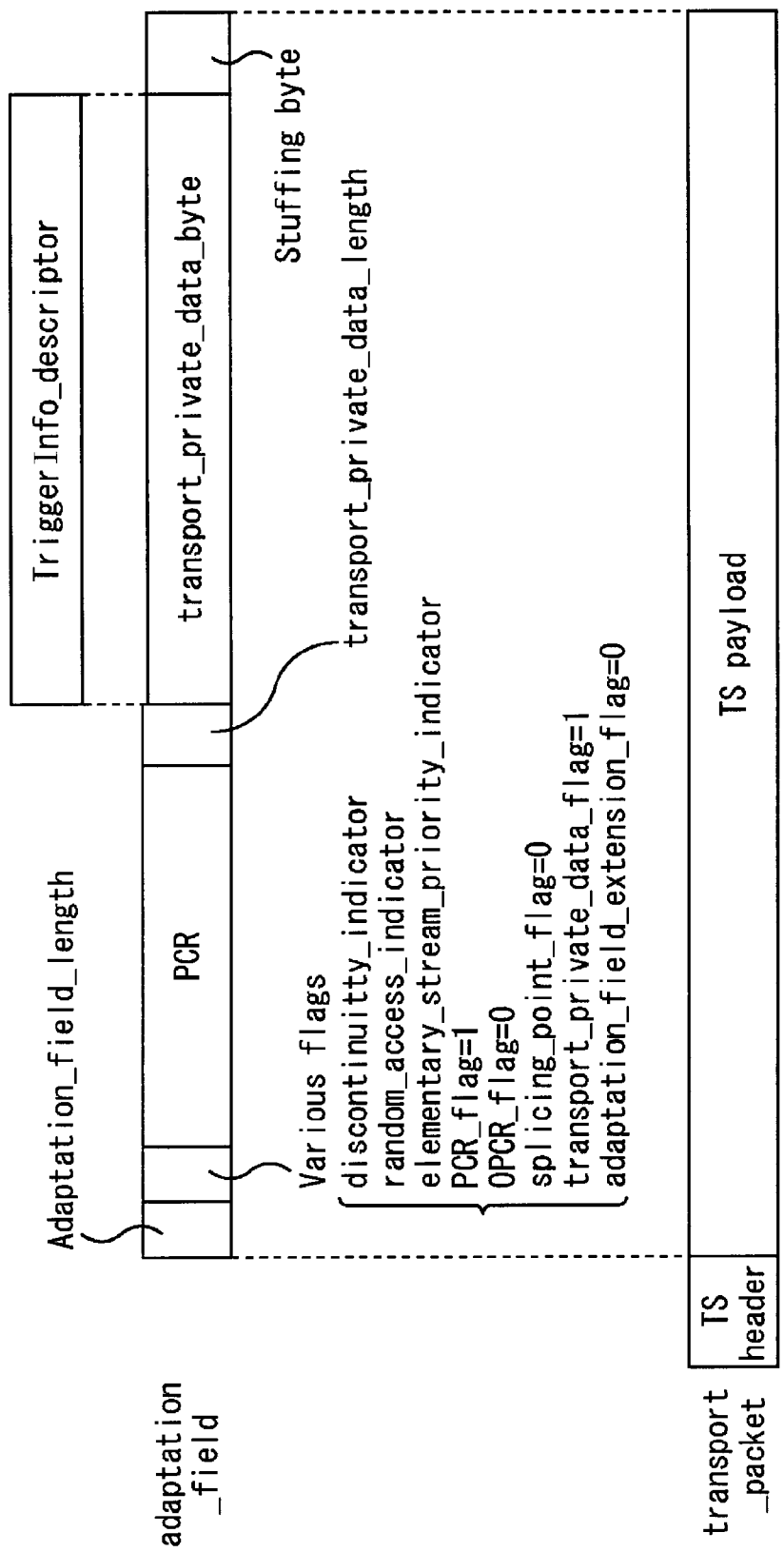
FIG. 6 is a diagram showing a specific arrangement of the trigger information in the PCR packet.

FIG. 6 shows a position at which the trigger information is stored in a PCR packet. The PCR packet is obtained by storing a PCR in "adaptation_field" of a TS packet, and the trigger information (TriggerInfo_descriptor) is stored in "transport_private_data_byte" subsequent to the PCR. It should be noted that in a case where the trigger information is stored, "transport_private_data_flag" of "Various flags" provided before the PCR is set to 1.

FIG. 7 shows an example of information items included in the trigger information.

A trigger ID is information for identifying relevant trigger information. In the case where the same trigger information is transmitted a plurality of number of times, the trigger IDs of the respective pieces of trigger information are the same. Further, the same trigger ID is imparted to pieces of trigger information in which only server access distribution parameters described later are different. A trigger type indicates that the trigger information is in any state of "application execute" (that instructs acquisition and activation of data broadcast application), "application terminate" (that instructs end of data broadcast application being executed), "inject-event" that instructs dispatch of event (update of displayed contents etc.) in data broadcast application being executed), and "pre-cache" (that instructs only acquisition of data broadcast application).

An application ID is information for identifying a data broadcast application corresponding to the trigger information. An application type is information indicating a type of the data broadcast application (for example, html and java) corresponding to the trigger information. A business company ID is information for identifying a business company (broadcast station etc.) that performs a service of executing the data broadcast application corresponding to the trigger information. An application URL (Uniform Resource Locator) is a URL of an acquisition source, that is, information regarding a location, of the data broadcast application (in this case, server 42) in the case where the trigger type is "application execute" or "precache". An accumulation application ID is described only when an accumulated data broadcast application to be activated (already acquired data broadcast application) is designated without instantly acquiring a data broadcast application in the case where the trigger type is "application execute".

An automatic activation flag is described in the case where the trigger type is "application execute" and is set to on or off. When the automatic activation flag is on, "automatic execute" (to automatically activate data broadcast application) is set. When the automatic activation flag is off, "manual activation" (to prompt user to make operation input and activate data broadcast application in accordance with operation input) is set.

An application end time is information that indicates a time at which the data broadcast application being executed is ended in the case where the trigger information whose trigger type is "application terminate" is not received.

A server access distribution parameter is a value N (integer of 2 or more) for distributing access, or controlling attempts to access server 42 among a plurality of receiver devices so as to avoid concentration on a certain period of time when each reception apparatus 60 that has received the trigger information acquires a data broadcast application from the server 42. For example, to distribute access to the server 42 from a possible large number of reception apparatuses 60 into 4 times, it is only necessary to transmit the same trigger information 4 times, and set the server access distribution parameter N of the first trigger information to 4, the server access distribution parameter N of the second trigger information to 3, the server access distribution parameter N of the third trigger information to 2, and the server access distribution parameter N of the fourth trigger information to 1. That is, the access distribution parameter may be sequentially inserted or transmitted as a plurality of values. It should be noted that in a case where the trigger information is not related to the access to the server 42, the server access distribution parameter N has only to be set to 1. Details of the server access distribution parameter will be described later with reference to FIG. 10.

An application name is a name of a data broadcast application to be presented to the user in a case where the automatic activation flag is set to "manual activation". An event ID is information for identifying an event in a case where the trigger type is set to "inject-event". It should be noted that the trigger information does not include all the items described above generally, but includes only items necessary at that timing.

FIG. 8 shows an example of a syntax of the trigger information. It should be noted that the syntax of the trigger information is arbitrarily set and is not limited to that of FIG. 8.

[Description on Operation]

Next, an operation at a time when the reception apparatus 60 receives the trigger information (hereinafter, referred to as trigger information processing) will be described.

Figure 9:
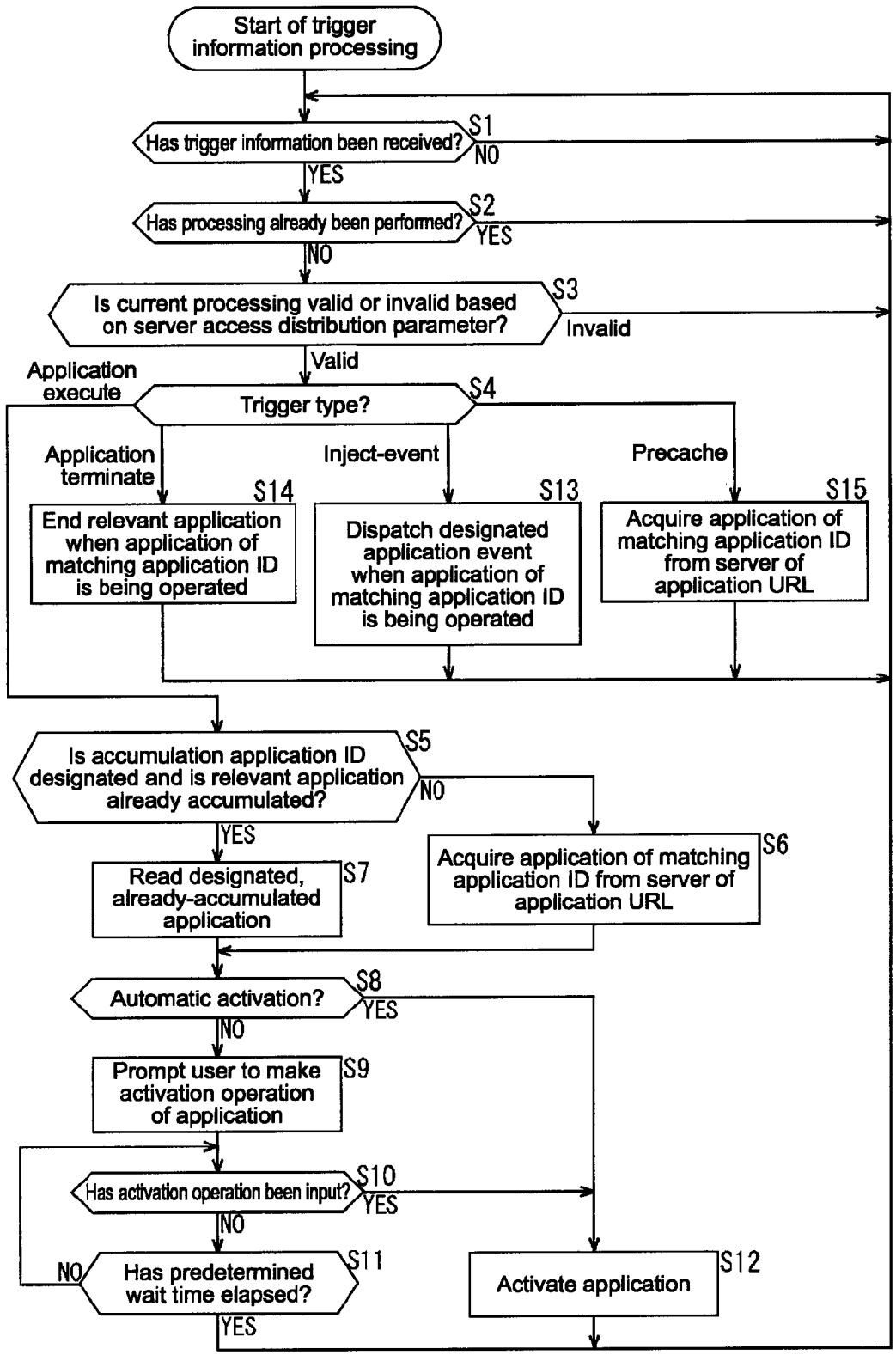
FIG. 9 is a flowchart for describing trigger information processing.

FIG. 9 is a flowchart for describing the trigger information processing. The trigger information processing is executed repeatedly when the user is viewing a television program, that is, during a period of time in which a digital television broadcast signal is being received.

In Step S1, the controller 68 waits until a PCR packet including trigger information is received based on an input from the demultiplexing section 62. Then, when the PCR packet including trigger information is received, the processing proceeds to Step S2.

In Step S2, the controller 68 extracts the trigger information from the received PCR packet and judges whether processing of Step S4 and subsequent steps are already performed on the trigger information. When it is judged that the processing of Step S4 and subsequent steps are already performed, the processing returns to Step 1 and repeats the subsequent steps. Conversely, when it is judged that processing of Step S4 and subsequent steps are not performed on the trigger information, the processing proceeds to Step S3.

In Step S3, the controller 68 judges whether the current processing is valid (whether the processing proceeds to Step S4 and subsequent steps to perform server access) or invalid (whether the processing returns to Step S1) based on the server access distribution parameter N of the trigger information. It should be noted that in a case where the server access distribution parameter N is not described in the trigger information, the processing proceeds to Step S4.

Here, the judgment in Step S3 as to whether the current processing is valid or invalid will be described in detail with reference to FIG. 10.

As shown in FIG. 10B, in order to distribute access to the server 42 from a possible large number of reception apparatuses 60 into 4 times as an intention of the broadcast station side, the same trigger information is transmitted 4 times from the broadcast apparatus 41, and the server access distribution parameter N may have a plurality of values. For example, the server access distribution parameter N of the first trigger information is set to 4, the server access distribution parameter N of the second trigger information to 3, the server access distribution parameter N of the third trigger information to 2, and the server access distribution parameter N of the fourth trigger information to 1.

In response to this, the controller 68 of the reception apparatus 60 judges validity or invalidity based on random numbers or the like under the condition in which validity is judged in the probability of 1/N, that is, the server access distribution parameter N corresponds to different probabilities of access to the server.

As a result, assuming that 10,000 reception apparatuses 60 simultaneously execute the trigger information processing, the processing is judged to be valid in about 2,500 (=10,000/ 4) reception apparatuses 60 by the first trigger information (server access distribution parameter N=4), additionally in about 2,500 (=7,500/3) reception apparatuses 60 by the second trigger information (server access distribution parameter N=3), additionally in about 2,500 (=5,000/2) reception apparatuses 60 by the third trigger information (server access distribution parameter N=2), and in the remaining (=2,500/1) reception apparatuses 60 by the fourth trigger information (server access distribution parameter N=1). Accordingly, the probability of access by the plurality of reception apparatuses increases with successive requests to the server.

With referring back to FIG. 9, in Step S4, the controller 68 judges to which of "application execute", "inject-event", "application terminate", and "precache" a trigger type of the trigger information is set.

When a trigger type of the trigger information is judged to be "application execute" in Step S4, the processing proceeds to Step S5. In Step S5, the controller 68 judges whether an accumulation application ID is designated in the trigger information and a data broadcast application corresponding thereto is already accumulated in the recording section 71. When it is judged that an accumulation application ID is not designated and a data broadcast application corresponding thereto is not accumulated, the processing proceeds to Step S6. In Step S6, the controller 68 controls the browser 73 to access the server 42 that corresponds to an application URL of the trigger information and acquire a data broadcast application that corresponds to an application ID of the trigger information. Here, in a case where a relevant data broadcast application is already acquired from the server 42 that corresponds to the application URL in Step S15 described later and precached, the data broadcast application is used. After that, the processing proceeds to step S8.

Conversely, when it is judged in Step S5 that an accumulation application ID is designated in the trigger information and a data broadcast application corresponding thereto is already accumulated in the recording section 71, the processing proceeds to Step S7. In Step S7, the controller 68 controls the browser 73 to read the data broadcast application corresponding to the accumulation application ID of the trigger information from the recording section 71. After that, the processing proceeds to Step S8.

In Step S8, the controller 68 judges whether an automatic activation flag of the trigger information is set to "automatic execute".

When it is judged in Step S8 that an automatic activation flag of the trigger information is not "automatic activation" (that is, the flag is set to "manual activation"), the processing proceeds to Step S9. In Step S9, the browser 73 prompts the user to make an activation operation of the data broadcast application by displaying, for example, "Execute (application name)?" on a screen based on the control by the controller 68. When it is judged in Step S10 that an activation operation has been input by the user in response to the prompt display, the processing proceeds to Step S12. In Step S12, the browser 73 activates the data broadcast application that has been acquired in Step S6 or read in Step S7 under the control of the controller 68. After that, the processing returns to Step S1 and repeats Step S1 and the subsequent steps.

It should be noted that when it is judged that an activation operation is not input by the user in Step S10 after the prompt display in Step S9 and that a predetermined period of time has elapsed without an activation operation input by the user in Step S11, the processing returns to Step S1 and repeats Step S1 and the subsequent steps.

It should be noted that when it is judged in Step S8 that an automatic activation flag of the trigger information is set to "automatic activation", the processing proceeds to Step S12. In Step S12, the browser 73 activates the data broadcast application that has been acquired in Step S6 or read in Step S7 under the control of the controller 68. After that, the processing returns to Step S1 and repeats Step S1 and the subsequent steps.

When it is judged in Step S4 that a trigger type of the trigger information is "inject-event", the processing proceeds to Step S13. In Step S13, only when an application ID of the trigger information is matched to an application ID of the data broadcast application being operated, the controller 68 controls the browser 73 to dispatch (execute) an event corresponding to an event ID of the trigger information in the application being operated. After that, the processing returns to Step S1 and repeats Step S1 and the subsequent steps.

When it is judged in Step S4 that a trigger type of the trigger information is "application terminate", the processing proceeds to Step S14. In Step S14, only when an application ID of the trigger information is matched to an application ID of the data broadcast application being operated, the controller 68 controls the browser 73 to end the application being operated. After that, the processing returns to Step S1 and repeats Step S1 and the subsequent steps.

It should be noted that even when the trigger information whose trigger type is "application terminate" is not received, the data broadcast application being operated is ended when an application end time comes, the application end time being described in the trigger information when the data broadcast application being operated has been activated.

When it is judged in Step S4 that a trigger type of the trigger information is "precache", the processing proceeds to Step S15. In Step S15, the controller 68 controls the browser 73 to access the server 42 corresponding to an application URL of the trigger information and acquire a data broadcast application corresponding to an application ID of the trigger information, to thereby store the data broadcast application in a storage means such as a cache memory included in the browser 73. After that, the processing returns to Step S1 and repeats Step S1 and the subsequent steps.

When the trigger type is "precache" as in Step S15, before a broadcast time of a television program to be interlocked comes, a corresponding data broadcast application can be acquired. As a result, the corresponding data broadcast application can be executed simultaneously with the start of the television program to be interlocked. In addition, an effect of distributing the concentration of access to the server 42 is expected. The description on the trigger information processing is ended up to here.

[Display Example of Screen when Data Broadcast Application is Executed]

Figure 11:
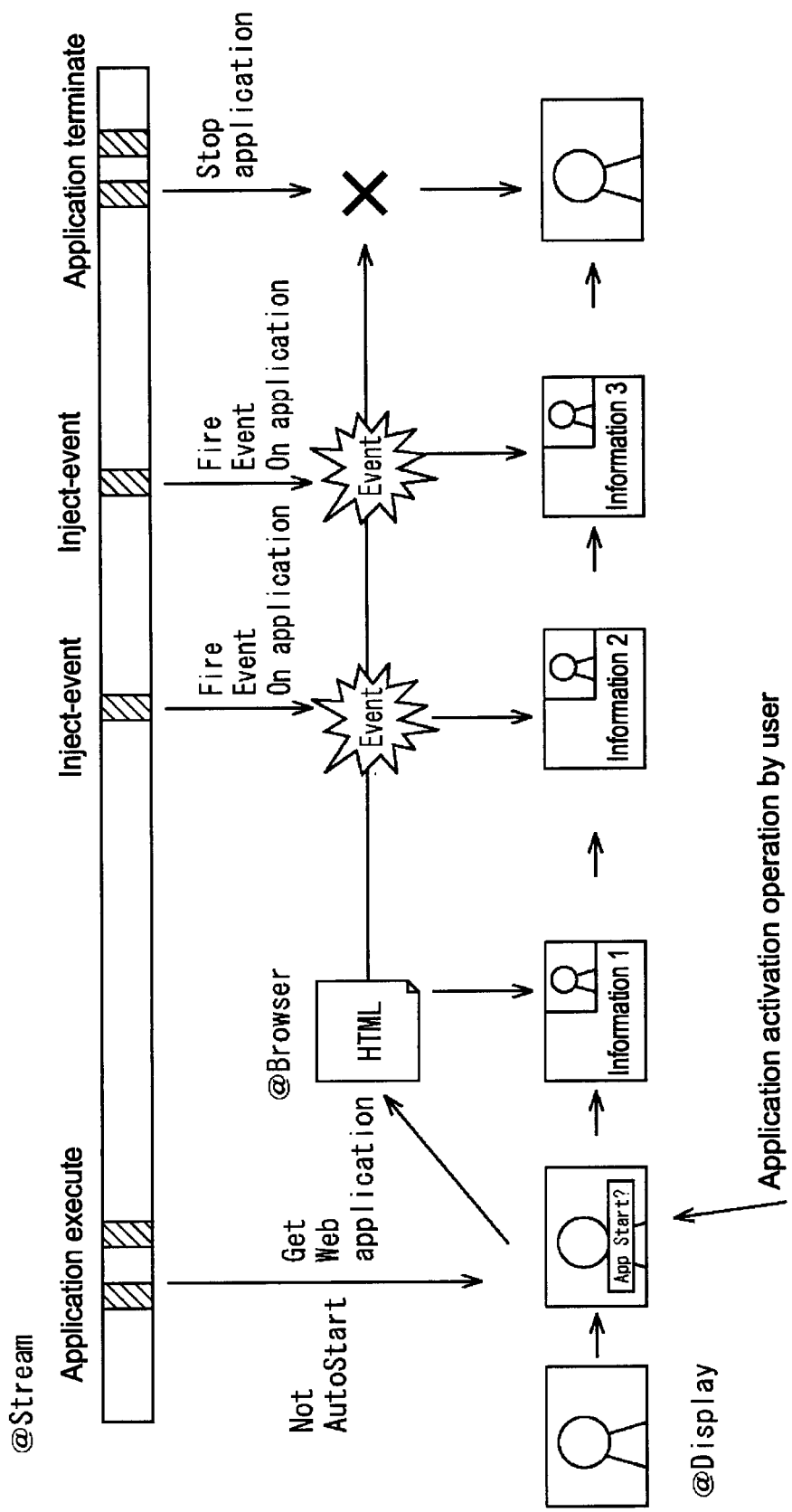
FIG. 11 is a display example of a screen at a time when a data broadcast application is executed.

FIG. 11 shows a transition of a screen at a time when a data broadcast application is executed interlocking with the progress of a television program in a case where the automatic activation flag of the trigger information is off ("manual activation").

When the trigger information whose trigger type is "application execute" and automatic activation flag is off ("manual activation") is received during a time when the user is viewing a television program, a corresponding data broadcast application is acquired. Next, an indication that prompts the user to make an activation operation of the data broadcast application is displayed to be superimposed on a video of the television program. When the user inputs the activation operation in response to the prompt, the data broadcast application is activated and the display of the screen is changed into a combination of a video corresponding to the data broadcast application and the video of the television program.

When the trigger information whose trigger type is "inject-event" is received in a state where the data broadcast application is being executed, an event corresponding to an event ID of the trigger information is dispatched in the data broadcast application being executed. As a result, an area of the screen display that corresponds to the data broadcast application is changed into a video corresponding to the event ID of the trigger information.

After that, when the trigger information whose trigger type is "application terminate" is received, the data broadcast application being executed is ended and the video of the television program is displayed on the entire screen.

[Another Display Example of Screen when Data Broadcast Application is Executed]

Incidentally, the data broadcast application that is executed interlocking with the progress of a television program is not necessarily accompanied with display on the screen. With use of such a data broadcast application, that data broadcast application can be executed without being known by the user of the reception apparatus 60. Such a data broadcast application is applicable to a case where an audience survey of a television program is executed, for example. Specifically, whether the television program is being viewed is recorded in accordance with the trigger information whose trigger type is "inject-event", and the recording results are notified to a predetermined server at a predetermined timing, with the result that an audience rating of the television program can be investigated at a transmission interval of the trigger information whose trigger type is "inject-event".

Figure 12:
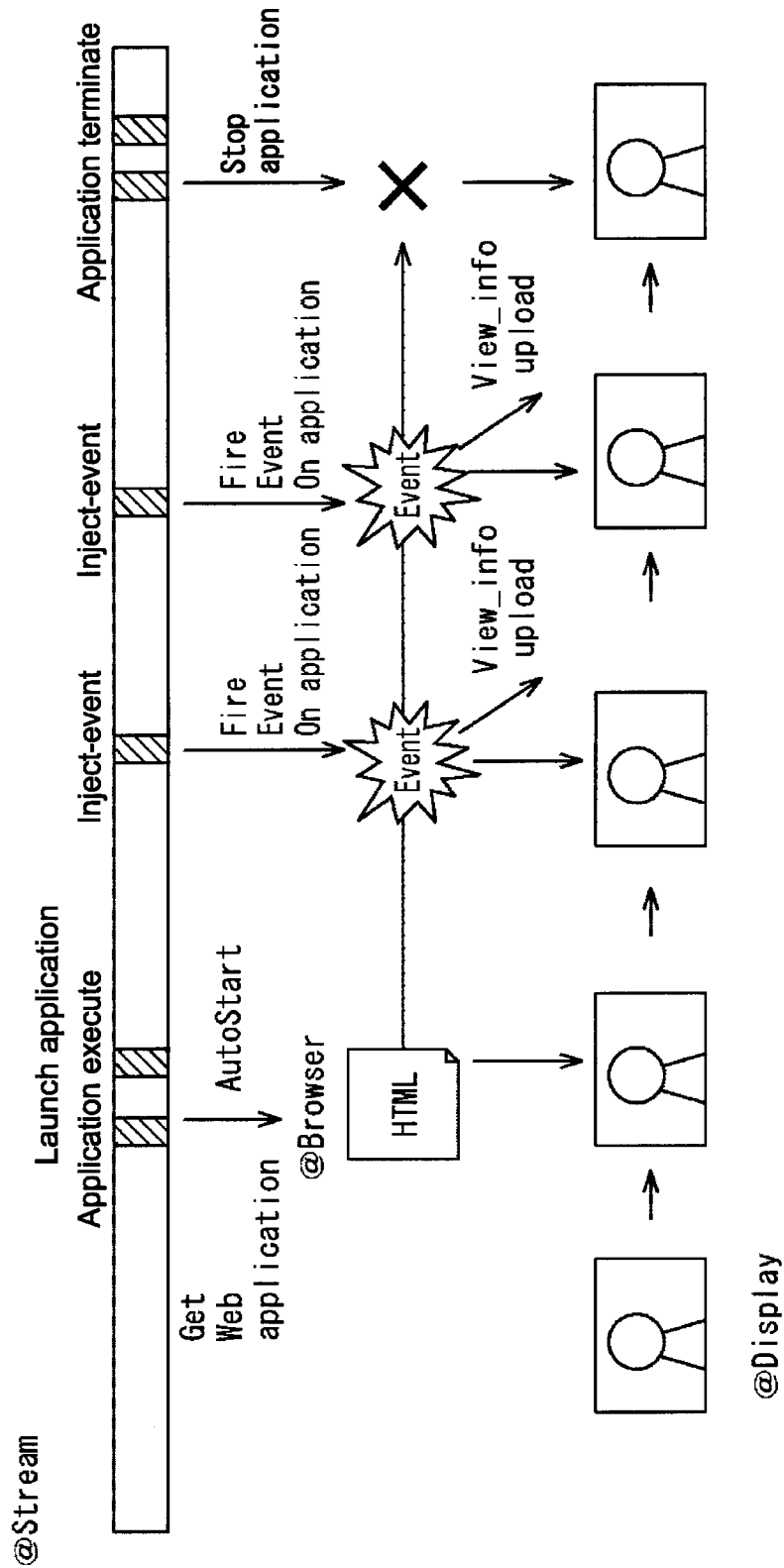
FIG. 12 is another display example of the screen at the time when the data broadcast application is executed.

FIG. 12 shows a transition of a screen at a time when a data broadcast application without display on the screen is executed interlocking with the progress of a television program in a case where the automatic activation flag of the trigger information is on ("automatic activation").

When the trigger information whose trigger type is "application execute" and automatic activation flag is on ("automatic activation") is received during a time when the user is viewing a television program, a corresponding data broadcast application is acquired and activated. It should be noted that the display on the screen is not changed with the video of the television program displayed.

When the trigger information whose trigger type is "inject-event" is received in a state where the data broadcast application is being executed, an event corresponding to an event ID of the trigger information is dispatched in the data broadcast application being executed. In this case as well, the video of the television program is left displayed and the display on the screen is not changed.

After that, when the trigger information whose trigger type is "application terminate" is received, the data broadcast application being executed is ended.

[Another Transmission Method of Trigger Information]

Though the trigger information is stored in the PCR packet of the TS to be transmitted in the above description, the trigger information may be embedded in a base band video signal to be transmitted.

FIG. 13 show two examples in which the trigger information is embedded in a base band video signal.

FIG. 13A shows an example in which the trigger information is changed into a two-dimensional barcode and superimposed at a predetermined position in an image of the base band video signal (in this case, lower right corner). FIG. 13B shows an example in which the trigger information is changed into a video code and combined into number lines positioned on a lower side of an image of the base band video signal. The trigger information of FIGS. 13A and 13B are detected by the trigger detection section 66 of the reception apparatus 60.

Figure 2:
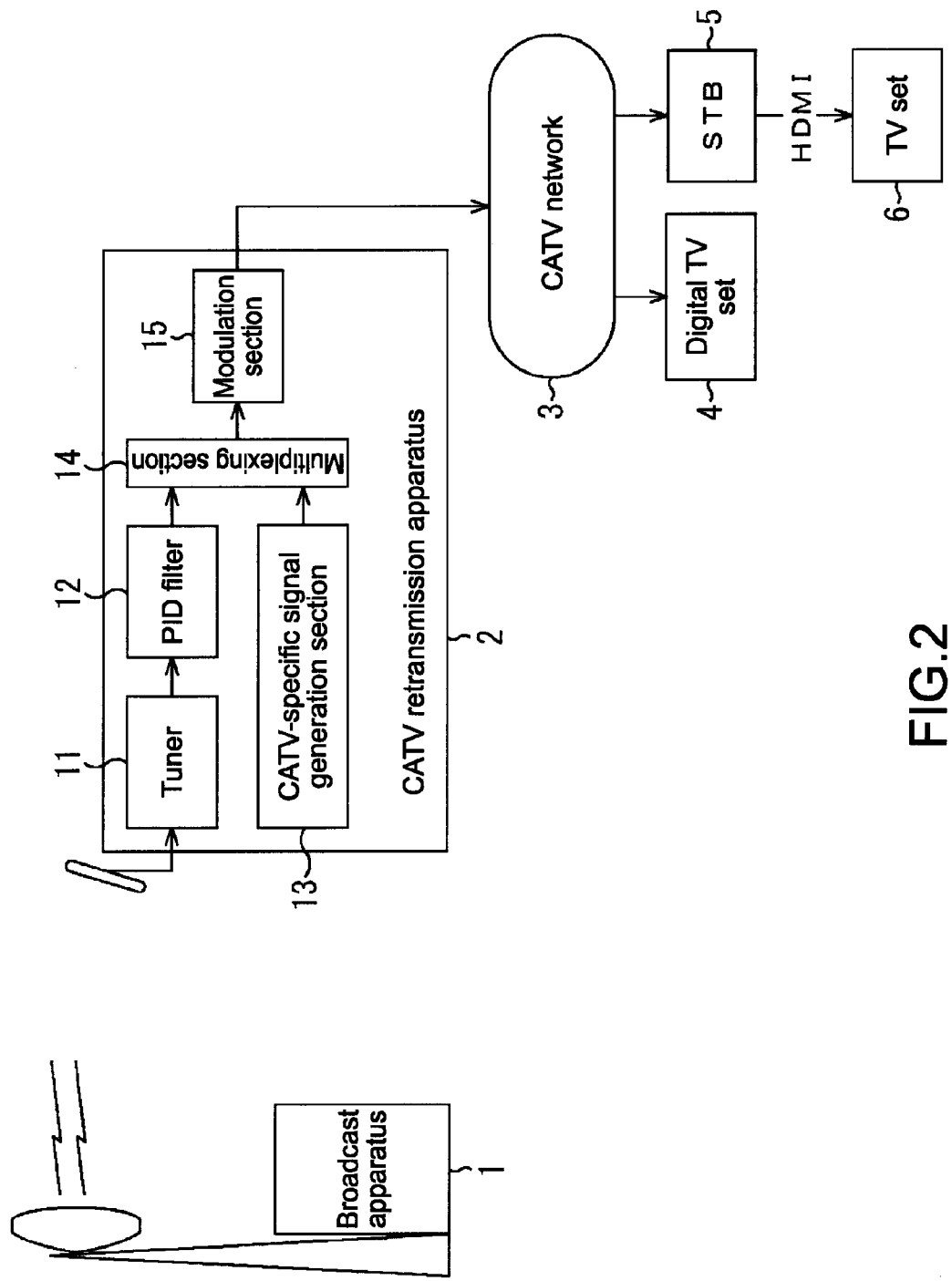
FIG. 2 is a diagram showing an example of a structure of an existing CATV retransmission system.

Since the trigger information is arranged on the screen of the television program in both FIGS. 13A and 13B, the trigger information can also be notified to, for example, a reception apparatus using a CATV network (for example, television set 6 of FIG. 2).

Further, though the trigger information on the screen (two-dimensional barcode and video code) can be viewed by the user of the reception apparatus 60 in both cases of FIGS. 13A and 13B, if this is not desirable, the two-dimensional barcode or video code may be displayed after being masked by the same pixels as those around the two-dimensional barcode or video code.

As described above, according to the broadcast system 30 to which the embodiment of the present invention is applied, the trigger information related to data broadcast is embedded in a PCR packet or a base band video signal to be transmitted, whereas a data broadcast application is supplied from a server via the Internet. As a result, a service of data content that can interlock with television programs can be realized without providing a band for data broadcast in a broadcast band for digital television broadcast.

Further, the access to the server can be distributed so as to avoid the concentration thereof on a certain period of time.

In addition, it is also possible to realize a service of data content that can interlock with television programs in a case where digital television programs are retransmitted via a CATV network, a satellite communication network, or the like.

Incidentally, a series of processing described above can be executed by hardware and can also be executed by software. In a case where a series of processing is executed by software, a program constituting the software is installed from a program recording medium to a computer incorporated in dedicated hardware, a general-purpose personal computer capable of executing various functions by installing various programs, or the like.

Figure 14:
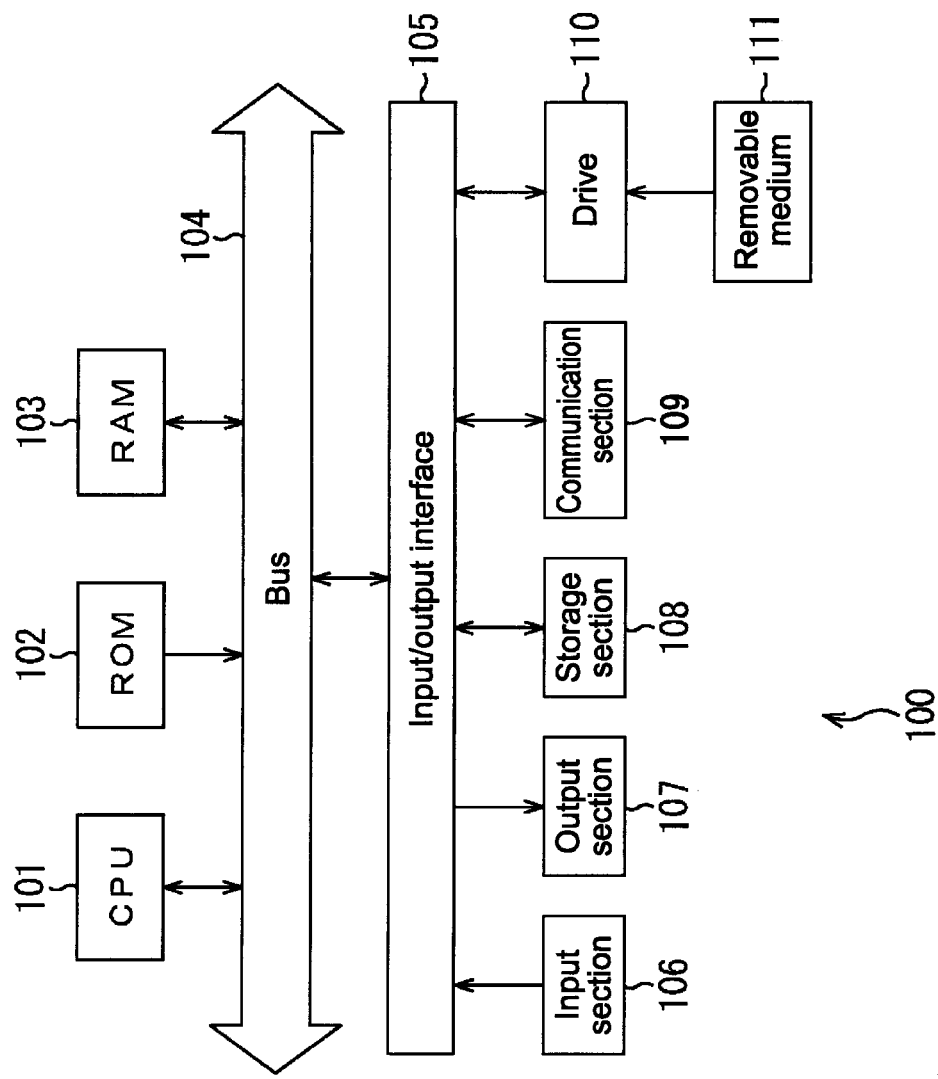
FIG. 14 is a block diagram showing a structural example of a computer.

FIG. 14 is a block diagram showing a structural example of hardware of a computer that executes the series of processing described above by a program.

In this computer 100, a CPU (Central Processing Unit) 101, a ROM (Read Only Memory) 102, and a RAM (Random Access Memory) 103 are connected to one another via a bus 104.

An input/output interface 105 is also connected to the bus 104. Connected to the input/output interface 105 are an input section 106, an output section 107, a storage section (that is, a computer-readable storage medium) 108, a communication section 109, and a drive 110. The input section 106 includes a keyboard, a mouse, a microphone, and the like. The output section 107 includes a display, a speaker, and the like. The storage section 108 includes a hard disk, a nonvolatile memory, and the like, and may store instructions for execution by the CPU. The communication section 109 includes a network interface and the like. The drive 110 drives removable medium 111 such as a magnet disc, an optical disc, a magneto-optical disc, or a semiconductor memory.

In the computer structured as described above, the CPU 101 loads a program having instructions stored in, for example, the storage section 108 in the RAM 103 via the input/output interface 105 and the bus 104 and executes the program, with the result that the series of processing described above is performed.

It should be noted that the program executed by the computer may be a program with which processing is performed in a chronological order along the order described herein, or may be a program with which processing is performed in parallel or at a necessary timing when a calling is made or the like.

Further, the program may be one processed by one computer or one processed in a distributed manner by a plurality of computers. In addition, the program may be one transferred to a remote computer and then executed.

Further, the system herein refers to a plurality of apparatuses, as a whole.

It should be noted that the embodiment of the present invention is not limited to the embodiment described above and various changes can be made without departing from the gist of the present invention.

The present application contains subject matter related to that disclosed in Japanese Priority Patent Application JP 2009-287228 filed in the Japan Patent Office on Dec. 18, 2009, the entire content of which is hereby incorporated by reference.

REFERENCE SIGNS LIST 30 broadcast system
41 broadcast apparatus
42 server
60 reception apparatus
61 tuner
62 demultiplexing section
63 audio decoder
64 audio output section
65 video decoder
66 trigger detection section
67 video output section
68 controller
69 memory
70 operation section
71 recording section
72 communication I/F
73 browser

The invention claimed is:

1. An apparatus for providing access to data content on a server, comprising:
a processor,
wherein the processor is configured to initiate an insertion of information regarding the data content into Program Clock Reference (PCR) packets of a transport stream of a digital television broadcast signal, the PCR packets configured to remain in the transport stream after processing by a television retransmission system, and the digital television broadcast signal configured to not include the data content,
wherein the information regarding the data content is not inserted into all the PCR packets of the transport stream but only inserted into the PCR packets at adequate timings to enable successful interlocking with an audiovisual (AV) program content included in the digital television broadcast signal, and
wherein the processor is further configured to initiate an outputting of the digital television broadcast signal for broadcast.

2. The apparatus of claim 1, wherein the information regarding the data content comprises timing information indicating execution timing of the data content.

3. The apparatus of claim 2, wherein the information regarding the data content is entirely timing information.

4. The apparatus of claim 2, wherein the information regarding the data content comprises an access distribution parameter for distributing access to the server among a plurality of receiver devices.

5. The apparatus of claim 4, wherein the access distribution parameter corresponds to a desired probability of access to the server by the plurality of receiver devices.

6. The apparatus of claim 5, wherein the probability of access by the plurality of receiver devices increases with successive requests to access the server.

7. The apparatus of claim 4, wherein the processor initiates an insertion of a plurality of values as the access distribution parameter.

8. The apparatus of claim 7, wherein the processor initiates a sequential insertion of a plurality of values as the access distribution parameter to modify the probability of access to the server among the plurality of receiver devices.

9. The apparatus of claim 1, wherein the information regarding the data content comprises trigger information.

10. The apparatus of claim 9, wherein the trigger information comprises at least one of information regarding execution of the data content or information regarding location of the data content.

11. An apparatus for receiving data content, comprising:
a processor,
wherein the processor is configured to control a reception, over a first communication channel, of a digital television broadcast signal containing information regarding the data content accessible over a second communications channel,
wherein the information regarding the data content is contained in Program Clock Reference (PCR) packets of a transport stream of the digital television broadcast signal, the PCR packets configured to remain in the transport stream after processing by a television retransmission system,
wherein the information regarding the data content is not contained in all the PCR packets of the transport stream but only contained in the PCR packets at adequate timings to enable successful interlocking with an audiovisual (AV) program content included in the digital television broadcast signal, and
wherein the processor is further configured to control an extraction of the information regarding the data content from the digital television broadcast signal.

12. The apparatus of claim 11, wherein the information regarding the data content comprises timing information indicating execution timing of the data content.

13. The apparatus of claim 12, wherein the information regarding the data content is entirely timing information.

14. The apparatus of claim 12, wherein the information regarding the data content comprises an access distribution parameter for controlling requests to access a server containing the data content.

15. The apparatus of claim 14, wherein a probability of access to the server is based on the access distribution parameter.

16. The apparatus of claim 15, wherein the probability of access to the server increases with successive requests to access the server.

17. The apparatus of claim 14, wherein the access distribution parameter is based on a desired probability of access to the server.

18. The apparatus of claim 17, wherein the information regarding the data content includes a plurality of values as the access distribution parameter corresponding to different probabilities of access to the server.

19. The apparatus of claim 11, wherein the information regarding the data content comprises trigger information.

20. The apparatus of claim 19, wherein the trigger information comprises at least one of information regarding execution of the data content or information regarding location of the data content.

21. A method for providing access to data content on a server, comprising:
inserting information regarding the data content into Program Clock Reference (PCR) packets of a transport stream of a digital television broadcast signal, the PCR packets configured to remain in the transport stream after processing by a television retransmission system, and the digital television broadcast signal configured to not include the data content; and
outputting the digital television broadcast signal,
wherein the information regarding the data content is not inserted into all the PCR packets of the transport stream but only inserted into the PCR packets at adequate timings to enable successful interlocking with an audiovisual (AV) program content included in the digital television broadcast signal.

22. The method of claim 21, wherein the information regarding the data content comprises timing information indicating execution timing of the data content.

23. The method of claim 22, wherein the information regarding the data content is entirely timing information.

24. The method of claim 22, wherein the information regarding the data content comprises an access distribution parameter for distributing access to the server among a plurality of receiver devices.

25. The method of claim 24, wherein the access distribution parameter corresponds to a desired probability of access to the server among the plurality of receiver devices.

26. The method of claim 25, wherein the probability of access by the plurality of receiver devices increases with successive requests to access the server.

27. The method of claim 24, comprising sequentially inserting a plurality of values as the access distribution parameter.

28. The method of claim 21, wherein the information regarding the data content comprises trigger information.

29. The method of claim 28, wherein the trigger information comprises at least one of information regarding execution of the data content or information regarding location of the data content.

30. A method for receiving data content, comprising:
receiving, over a first communication channel, a digital television broadcast signal containing information regarding the data content accessible over a second communications channel; and
extracting the content information from the digital television broadcast signal,
wherein the information regarding the data content is contained in Program Clock Reference (PCR) packets of a transport stream of the digital television broadcast signal, the PCR packets configured to remain in the transport stream after processing by a television retransmission system, and
wherein the information regarding the data content is not contained in all the PCR packets of the transport stream but only contained in the PCR packets at adequate timings to enable successful interlocking with an audiovisual (AV) program content included in the digital television broadcast signal.

31. The method of claim 30, wherein the information regarding the data content comprises timing information indicating execution timing of the data content.

32. The method of claim 31, wherein the information regarding the data content is entirely timing information.

33. The method of claim 31, comprising:
selectively attempting to access a server containing the data content based on an access distribution parameter contained in the information regarding the data content.

34. The method of claim 33, wherein a probability of access to the server is based on the access distribution parameter.

35. The method of claim 34, wherein the probability of access to the server increases with successive requests to access the server.

36. The method of claim 33, comprising receiving a plurality of values as the access distribution parameter corresponding to different probabilities of access to the server.

37. The method of claim 30, wherein the information regarding the data content comprises trigger information.

38. The method of claim 37, wherein the trigger information comprises at least one of information regarding execution of the data content or information regarding location of the data content.

39. A system for delivering data content, comprising:
a broadcasting apparatus configured to broadcast a digital television broadcast signal over a first communication channel, the digital television broadcast signal including information regarding the data content and not including the data content; and
a server configured to transmit the data content over a second communications channel in response to a request for the data content,
wherein the information regarding the data content is contained in Program Clock Reference (PCR) packets of a transport stream of the digital television broadcast signal, the PCR packets configured to remain in the transport stream after processing by a television retransmission system, and
wherein the information regarding the data content is not contained in all the PCR packets of the transport stream but only contained in the PCR packets at adequate timings to enable successful interlocking with an audiovisual (AV) program content included in the digital television broadcast signal.

40. A non-transitory computer-readable storage medium storing instructions which, when executed by a processor, cause a computer to perform a method comprising:
inserting information regarding the data content into Program Clock Reference (PCR) packets of a transport stream of a digital television broadcast signal, the PCR packets configured to remain in the transport stream after processing by a television retransmission system, and the digital television broadcast signal configured to not include the data content; and
outputting the digital television broadcast signal,
wherein the information regarding the data content is not inserted into all the PCR packets of the transport stream but only inserted into the PCR packets at adequate timings to enable successful interlocking with an audiovisual (AV) program content included in the digital television broadcast signal.

41. A non-transitory computer-readable storage medium storing instructions which, when executed by a processor, cause a computer to perform a method comprising:

receiving, over a first communication channel, a digital television broadcast signal containing information regarding the data content;

extracting the information regarding the data content from the digital television broadcast signal; and acquiring the data content over a second communications channel using the information regarding the data content, wherein the information regarding the data content is contained in Program Clock Reference (PCR) packets of a transport stream of the digital television broadcast signal, the PCR packets configured to remain in the transport stream after processing by a television retransmission system, and wherein the information regarding the data content is not contained in all the PCR packets of the transport stream but only contained in the PCR packets at adequate timings to enable successful interlocking with an audiovisual (AV) program content included in the digital television broadcast signal.

* * * * *